Oct. 28, 1952     L. MACKTA     2,615,934
HIGH VOLTAGE MEASURING APPARATUS
Filed Feb. 9, 1950
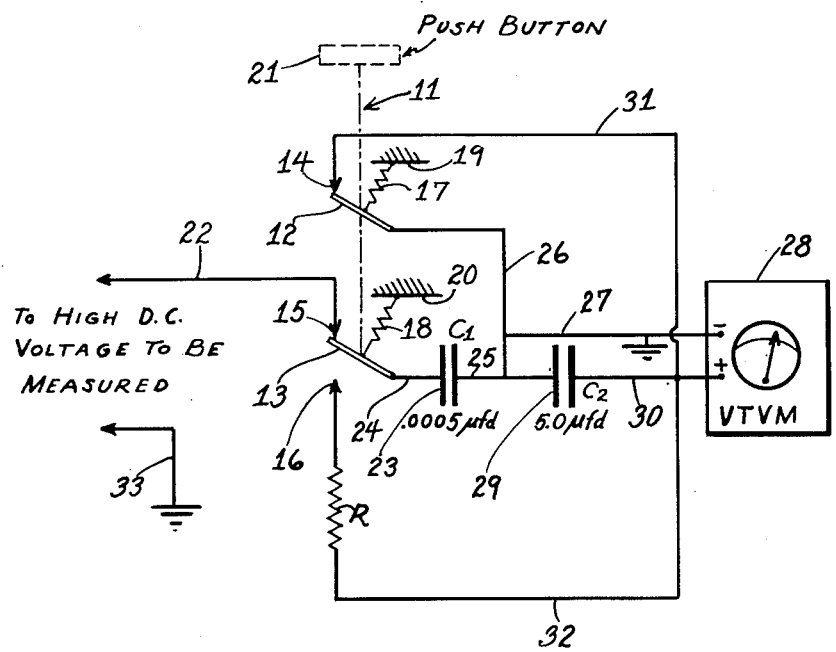
INVENTOR
LEO MACKTA
BY Herman L. Gordon
ATTORNEY Patented Oct. 28, 1952

2,615,934

UNITED STATES PATENT OFFICE 2,615,934

HIGH VOLTAGE MEASURING APPARATUS

Leo Mackta, Brooklyn, N. Y.

Application February 9, 1950, Serial No. 143,180

3 Claims. (Cl. 171—95)

This invention relates to voltage measuring devices, and more particularly to an instrument of the ballistic type for measuring high D. C. voltage, as for example, for measuring the output voltage of a source which cannot supply much current, such as a television high voltage power supply of the RF type.

A main object of the invention is to provide a novel and improved high voltage measuring device which is very simple in construction, involves only a few parts, and which gives accurate readings.

A further object of the invention is to provide an improved device for measuring high voltage D. C. which places no current drain on the source being measured, whereby inaccuracies due to poor regulation characteristics of the source are avoided.

A still further object of the invention is to provide an improved ballistic device for measuring high D. C. voltage, such as for measuring the output voltage of a television high voltage power supply of the RF type, said device being relatively inexpensive, being very easy to manipulate, and enabling voltages as high as 30 kv. to be accurately measured.

Further objects and advantages of the invention will become apparent from the following description and claims, and from the accompanying drawing, wherein the single figure is a schematic circuit diagram illustrating a voltage measuring device constructed in accordance with the present invention.

Referring now to the drawing, 11 designates generally a two-pole, two-position switch having the respective poles 12 and 13. Associated with pole 12 is an upper contact 14. Associated with pole 13 is an upper contact 15 and a lower contact 16. The poles 12 and 13 are biased into engagement with their respective upper contacts 14 and 15 by suitable springs, such as are shown respectively at 17 and 18, connected between said poles and respective upwardly adjacent stationary surfaces 19 and 20. Linked to the poles 12 and 13 in any suitable manner is a manual switch operating element, which may be, for example, a push button, shown in dotted view at 21. By depressing push button 21, poles 12 and 13 are disengaged from upper contacts 14 and 15 and pole 13 is engaged with its lower contact 16.

Connected to contact 15 is a high voltage test lead 22, which may be provided at its end with a suitable high voltage probe.

Designated at 23 is a high voltage condenser of relatively small capacity, for example, having a capacity of .0005 microfarad, as shown. One terminal of condenser 23 is connected to pole 13 by a wire 24. The other terminal of condenser 23 is connected by wires 25 and 26 to the pole 12. Wire 26 is connected to a grounded wire 27.

Designated at 28 is a vacuum tube voltmeter whose negative terminal is connected to the grounded wire 27, as shown. Designated at 29 is a condenser of relatively large capacity, for example, having a capacity of 5.0 microfarads. One terminal of condenser 29 is connected to wire 25. The other terminal of condenser 29 is connected by a wire 30 to the positive terminal of the vacuum tube voltmeter 28.

Contact 14 is connected to wire 30 by a wire 31. Contact 16 is connected to wire 30 by a wire 32, through a resistor R.

The operation of the apparatus is as follows: The high voltage probe at the end of test lead 22 is applied to the live terminal of the voltage source to be tested, which for example, may be the high voltage output terminal of a television RF power supply. The other terminal of said source is grounded, as shown at 33. This places a charge Q on the capacitor 23, according to the following equation:

$$Q = C_1 E_1$$

where $C_1$ is the capacity of condenser 23 and $E_1$ is the high voltage to be measured.

It will be noted that while condenser 23 is being charged, condenser 29 is short-circuited, by wire 25, wire 26, pole 12, contact 14, wire 31 and wire 30.

Push button 21 is next depressed, causing low capacitance condenser 23 to discharge through resistor R into the high capacitance condenser 29 through a circuit comprising wire 24, pole 13, contact 16, resistor R, wire 32, wire 30, condenser 29 and wire 25. The short circuit of condenser 29 is simultaneously opened at pole 12 and contact 14.

The charge Q is therefore transferred to condenser 29, and since said condenser has been previously completely discharged by the short circuit thereacross, $$Q = C_2 E_2$$

where $C_2$ is the capacitance of condenser 29 and $E_2$ is the voltage produced across said condenser by the charge Q. It therefore follows that $$C_1 E_1 = C_2 E_2$$

and $$E_1 = \frac{C_2}{C_1} E_2$$

The voltage $E_2$ is given by the vacuum tube voltmeter. $C_2$ and $C_1$ are known. Therefore, the reading of the vacuum tube voltmeter will be proportional to the high voltage $E_1$ to be measured.

The ratio of the capacity $C_2$ to $C_1$ is preferably an integral power of 10. For example, if $C_2$ is 5.0 mfd. and $C_1$ is .0005 mfd., the capacity ratio of $C_2$ to $C_1$ is 10,000 to 1. This makes the vacuum tube voltmeter direct reading, using a multiplier of 10,000. Using this capacity ratio, the voltage on the large condenser 29 is of the order of zero to 3 volts, where the applied voltage on condenser 23 is from zero to 30,000 volts.

The charge on the large condenser 29 is sufficient to give a reading for about 2 seconds on a 10 megohm input vacuum tube voltmeter, before the voltage starts to diminish. This has been found to be of sufficient duration to make convenient and accurate readings.

When the voltage indicated by the vacuum tube voltmeter begins to diminish, the push button 21 may be released, short-circuiting condenser 29 and applying a fresh charge Q to condenser 23. Upon depression of the push button, the correct voltage reading will again be given by the vacuum tube voltmeter. Therefore, by periodically depressing and releasing push button 21 at a relatively slow rate while applying the high voltage probe to the high voltage terminal of the source to be tested, a substantially constant reading may be obtained on the vacuum tube voltmeter.

The resistor R is employed to limit the rate at which condenser 23 discharges into condenser 29 and to prevent the voltage which is applied across the terminals of the vacuum tube voltmeter from having too steep a wave front. Overshooting of the pointer of the meter movement of the vacuum tube voltmeter is thereby avoided. It has been found that with an average meter movement, the resistor R should have a value of about 250,000 ohms. When a resistor of about this value is employed, the pointer moves smoothly up to its correct reading.

The condenser 23 should have a high voltage rating. The voltage rating of the condenser 29, however, need only be of the order of 10 volts.

An important advantage of the device above described is that there is no current drain on the voltage supply, as there is with voltage measuring instruments of the resistance-voltage divider type. This is particularly important in measuring the voltage of RF high voltage power supplies, such as those employed in television receivers, which cannot supply much current.

While a specific embodiment of a ballistic type high voltage measuring apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A high voltage measuring apparatus of the character described comprising switch means including a pole and a pair of contacts associated therewith, one contact being adapted to be connected to a terminal of the voltage source to be measured, a first condenser of relatively high voltage rating, a second condenser of relatively high capacity, a high impedance voltmeter connected across said second condenser, circuit means connecting said first condenser between said pole and one terminal of said voltmeter, means for connecting said one terminal of the voltmeter to the other terminal of the voltage source, circuit means connecting the other contact of said switch means to the remaining terminal of the voltmeter, and means arranged to short-circuit the second condenser responsive to the engagement of said pole with said one contact, to completely discharge said second condenser prior to the transfer of a charge thereto from the first condenser.

2. A high voltage measuring apparatus of the character described comprising first switch means including a pole and a pair of contacts associated therewith, one contact being adapted to be connected to a terminal of the voltage source to be measured, a first condenser of high voltage rating and relatively low capacity, a second condenser of relatively high capacity, a high impedance low-range voltmeter connected across said second condenser and arranged to give a voltage reading proportional to the charge of said second condenser, circuit means connecting said first condenser between said pole and one terminal of said voltmeter, means for connecting said one terminal of the voltmeter to the other terminal of the voltage source, circuit means connecting the other contact of said first switch means to the remaining terminal of the voltmeter, and additional switch means arranged to short-circuit the second condenser responsive to the engagement of said pole with said one contact and to remove the short circuit when said pole engages said other contact, whereby said second condenser is completely discharged when said pole engages said one contact prior to being charged by the engagement of said pole with the other contact, and whereby the indicated voltage across said second condenser when charged is proportional to the high voltage being measured.

3. A high voltage measuring apparatus of the character described comprising a first conductor adapted to be connected to a terminal of the voltage source to be measured, a double-throw switch comprising a pole and a pair of contacts associated therewith, one contact being connected to said first conductor, a first condenser of relatively low capacity and high voltage rating, a second condenser of relatively high capacity, a vacuum tube low-range voltmeter connected across said second condenser and arranged to give a voltage reading proportional to the charge of said second condenser, circuit means connecting said first condenser between said pole and one terminal of the vacuum tube voltmeter, means for connecting said one terminal of the voltmeter to the other terminal of the voltage source, circuit means connecting the other contact of said switch to the remaining terminal of the vacuum tube voltmeter, and another switch mechanically coupled to said first switch and arranged to short-circuit the second condenser when said pole engages said one contact and to remove the short circuit when said pole engages said other contact, the ratio of the capacity of said second condenser to the capacity of said first condenser being equal to an integral power of 10, whereby said second condenser is completely discharged when said pole engages said one contact prior to being charged by the engagement of said pole with the other contact, and whereby the indicated voltage across said second condenser when charged is proportional to the high voltage being measured and said high voltage is given by multiplying the indicated voltage by an integral power of 10.

LEO MACKTA

REFERENCES CITED

The following references are of record in the file of this patent:

UNITED STATES PATENTS

| Number | Name | Date |
|---|---|---|
| 2,473,542 | Philpott | June 21, 1949 |
| 2,511,868 | Newsom | June 20, 1950 |